US012522479B2

(12) United States Patent
Hoyt et al.

(10) Patent No.: US 12,522,479 B2
(45) Date of Patent: Jan. 13, 2026

(54) ANGLE SENSING CARTRIDGE PIN

(71) Applicant: Caterpillar Inc., Peoria, IL (US)

(72) Inventors: Daniel W. Hoyt, Brimfield, IL (US); Aaron J. Gnagey, Morton, IL (US)

(73) Assignee: Caterpillar Inc., Peoria, IL (US)

(*) Notice: Subject to any disclaimer, the term of this patent is extended or adjusted under 35 U.S.C. 154(b) by 264 days.

(21) Appl. No.: 18/216,301

(22) Filed: Jun. 29, 2023

(65) Prior Publication Data

US 2025/0002306 A1 Jan. 2, 2025

(51) Int. Cl.
*B66C 23/44* (2006.01)
*E02F 9/26* (2006.01)
*G01B 7/30* (2006.01)

(52) U.S. Cl.
CPC .............. *B66C 23/44* (2013.01); *E02F 9/264* (2013.01); *G01B 7/30* (2013.01)

(58) Field of Classification Search
CPC ............ E02F 9/264; B66C 23/44; G01B 7/30
See application file for complete search history.

(56) References Cited

U.S. PATENT DOCUMENTS 6,000,563 A * 12/1999 Greenberg .............. B66C 13/56 212/289
6,893,189 B2 * 5/2005 Matsushita ............. B66C 23/44 212/289
7,550,966 B2 6/2009 Kraft
7,896,178 B2 * 3/2011 Davis .................... B66C 23/365 212/196
8,152,412 B2 * 4/2012 Davis ...................... B66C 23/36 405/174
10,377,611 B2 8/2019 Latvys
10,378,180 B2 8/2019 Hosaka et al.
10,563,380 B2 2/2020 Shimizu et al.
10,968,605 B2 4/2021 Kawamura et al.
11,511,976 B2 * 11/2022 Caldwell ................. B66C 23/76
11,554,823 B2 * 1/2023 Jones ..................... B62D 55/21
2013/0115034 A1 * 5/2013 Subrt ...................... E02F 9/006 414/722
2020/0114717 A1 4/2020 Stratmann et al.

FOREIGN PATENT DOCUMENTS

CN 115140664 A * 10/2022 ............. B66C 23/44
EP 3235958 A1 * 10/2017 ................ E02F 3/30

* cited by examiner

*Primary Examiner* — Frederick L Lagman

(57) ABSTRACT

A pin cartridge assembly can include a pin having an outer surface. The pin cartridge assembly can also include a first sleeve coupled at the outer surface of the pin. The first sleeve can have a first end and a second end opposite the first end and the first sleeve can be statically coupled to a static structure at the first end. The pin cartridge assembly can also include a second sleeve. The second sleeve can be movably connected at the second end of the first sleeve. The pin cartridge assembly can further include an angle sensing element and an angle sensor target coupled to the first sleeve and the second sleeve to detect angle of rotation of a joint associated with the pin cartridge assembly.

16 Claims, 3 Drawing Sheets

ANGLE SENSING CARTRIDGE PIN

TECHNICAL FIELD

This disclosure relates to work machines, and more specifically to an assembly for sensing relative angles or angular displacement of movable portions of a work machine.

BACKGROUND

There is an ever-increasing demand for precise measurement of construction machine parameters during construction operations. For example, a pipelayer boom rotation angle should be accurately measured and controlled when performing pipe laying operations either by a local operator at the machine, or remotely by a remote operator or computer. It can be difficult to accurately position angle sensors for angle measurement because of the precise alignment that is required between the angle sensor and the sensor's corresponding target. Furthermore, angle sensors can be subjected to debris and other environmental factors that detract from accuracy potential.

U.S. Pat. No. 10,563,380 discusses a front linkage for a construction machine that can uniquely calculate the rotation angle of the work tool relative to the arm.

SUMMARY OF THE INVENTION

In an example according to the present disclosure, a pin cartridge assembly can include a pin having an outer surface. The assembly can include a first sleeve coupled at the outer surface of the pin. The first sleeve can have a first end and a second end opposite the first end. The assembly can include a second sleeve connected at the second end of the first sleeve. The assembly can include an angle sensing element and an angle sensor target coupled to the first sleeve and the second sleeve to detect angle of rotation of a joint associated with the pin cartridge assembly.

In another example, a pin joint for a work machine can include a frame having first and second wall portions, each of the first and second wall portions having a frame bore positioned therein. The pin joint can include a movable portion having a second bore positioned therein to align with the frame bore. The pin joint can include a pin cartridge assembly positioned in the frame bore and the second bore. The pin cartridge assembly can include a pin having an outer surface. The pin cartridge assembly can include a first sleeve coupled at the outer surface of the pin. The first sleeve can have a first end and a second end opposite the first end. The first sleeve can be statically coupled at the first end. The pin cartridge assembly can include a second sleeve movably connected at the second end of the first sleeve. The pin cartridge assembly can include an angle sensing element and an angle sensor target coupled to the first sleeve and the second sleeve to detect angle of rotation of a joint associated with the pin cartridge assembly.

BRIEF DESCRIPTION OF THE DRAWINGS

In the drawings, which are not necessarily drawn to scale, like numerals may describe similar components in different views. Like numerals having different letter suffixes may represent different instances of similar components. The drawings illustrate generally, by way of example, but not by way of limitation, various embodiments discussed in the present document.

DETAILED DESCRIPTION

Figure 1:
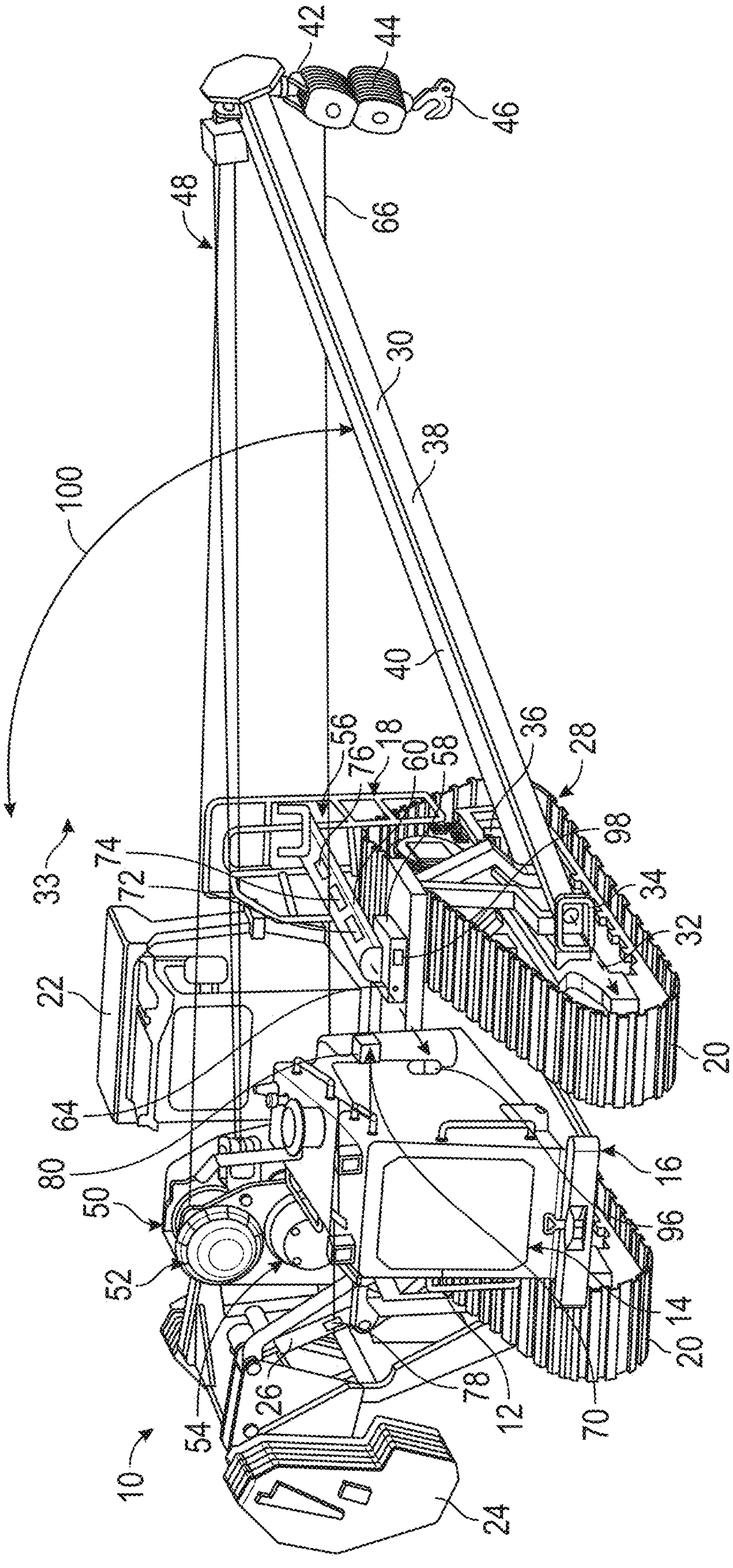
FIG. 1 shows a side view of a work machine, in accordance with this disclosure.

FIG. 1 shows a side view of a work machine 10, in accordance with this disclosure. While example embodiments are described with reference to a pipelayer work machine 10, examples according to this disclosure are applicable to a variety of types of work machines, including excavators, graders, and scrapers, as examples.

The work machine 10 can be structured as a pipelayer machine for transporting, suspending, and placing pipe sections of a pipeline. Machine 10 can include a frame 12 having a front frame end 16 and a back frame end 18. An engine system 14 can be mounted adjacent to front frame end 16. An operator station 22 can be coupled to and mounted upon frame 12 between front frame end 16 and back frame end 18. Operator station 22 can include an operator cab which can include a display or other circuitry or controller. Ground-engaging elements 20, including tracks in the illustrated embodiment, can be coupled to, and positioned upon opposite sides of frame 12. Machine 10 can further include a counterweight 24 positioned upon one side of frame 12 and adjustable by way of one or more counterweight actuators 26 in a generally conventional manner.

Machine 10 can include a hoisting system 28 having a sideboom 30 movable by pivoting relative to frame 12 about a sideboom pivot axis 32. Sideboom 30 may be pivotable between a raised or stowed position, at which sideboom 30 may be generally aligned with a vertical line 33, and a second sideboom position at which sideboom 30 extends outboard of frame 12. The second sideboom position could be approximately as illustrated in FIG. 1, however, sideboom 30 may be structured for lowering further than what is shown in FIG. 1, below a horizontal plane in certain embodiments. An example sideboom pivoting range is shown at 100. Counterweight 24 can be adjusted to offset a load supported by way of sideboom 30, such as a length of pipe. In an implementation, sideboom 30 may be coupled to frame 12 at each of a forward-mounting location and a rearward-mounting location by way of a forward connector 34 and a rearward connector 36. Sideboom 30 may further include a first or forward beam 38 and a second or rearward beam 40 that extend from connectors 34 and 36 in a generally triangular pattern. Other sideboom designs and configurations could be employed in different embodiments.

Hoisting system 28 can further include an upper hook pulley block 42 supported by sideboom 30, and a hoisting cable 66. A lower hook pulley block 44 can be suspended by way of hoisting cable 66 from upper hook pulley block 42 and can include a hook 46 for suspending a load, such as a pipe section within a roller sling or other load. One or more boom cables 48 can extend between sideboom 30 and a winch assembly or system 50.

Figure 2:
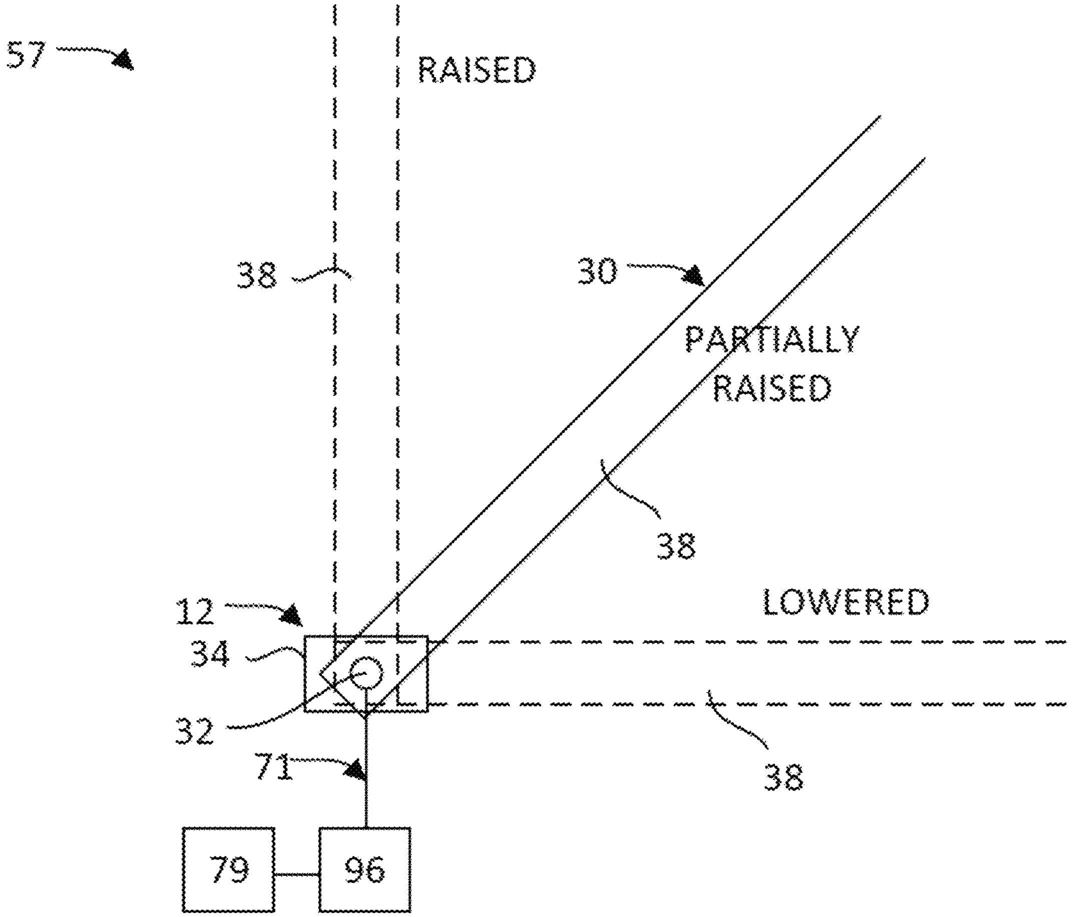
FIG. 2 illustrates a system in which a cartridge-style pin assembly can be provided in accordance with this disclosure.

Hoisting system 28 further includes a control system 70 that can include numerous sensors to monitor the load, cable feed, etc. and to monitor orientation of the load or counterweight 24 relative to the frame 12. A frame sensor is shown at 98 and may produce a frame monitoring signal indicative of an orientation of frame 12 relative to an underlying substrate (e.g., ground surface). Control circuitry 79 (FIG. 2)

can also include or be coupled with one or more computers and operator input and control devices, for example in an operator cab, or a display in the operator cab, or to a power supply. A wiring harness 96 may couple to control circuitry 79.

As described earlier herein, positions (e.g., angles and/or orientations) of one or more pivotable components, of the machine 10, relative to each other can be important for control and operation of the machine 10. Various sensors that are configured to determine the relative positions of the one or more pivotable components (e.g., angle sensors) may be installed on the axis of rotation between two bodies. For example, rotary potentiometers, linear potentiometers, Hall effect sensors, inductive sensors, capacitive sensors, mechanical switches, etc. can be used to identify (e.g., measure) the relative positions (e.g., angles and/or orientations) of components of machine 10.

Angle sensor installations, today, are typically bolted on over a pin joint and are precisely aligned with the pin joint. The angle sensors are subject to harsh environments during use in construction work. A system of brackets, guards, alignment pins, etc. are often used for protection of sensor components. Such precision equipment can therefore be costly and difficult to maintain and to protect, adding to expense and maintenance of the work machine 10. Furthermore, imprecise alignment can reduce the effectiveness of angle measurement and the effectiveness of the overall work machine 10.

Apparatuses and devices, according to embodiments of the present disclosure, address these and other concerns by providing the angle sensor within a cartridge-style pin assembly where pivotable components are connected. For example, referring still to FIG. 1, the sideboom 30 can pivot relative to the frame 12 (e.g., about the sideboom pivot axis 32). Pin cartridge assemblies can be provided at these pivots, as described in more detail below.

FIG. 2 illustrates a system 57 in which a pin cartridge assembly can is associated with the sideboom 30 in accordance with this disclosure. Wiring harness 96 and/or an associated plug can electrically connect instrumentation circuitry to hoisting control circuitry 79. The wiring harness 96 may be part of instrumentation circuitry 71 and structured to electrically connect instrumentation circuitry 71 to hoisting control circuitry 79. It should be appreciated that the term “circuitry” as used herein contemplates not only electrical wiring and the like but also circuit elements and electrical components such as sensors, plugs, switches, capacitors, inductors, filters, transistors, and still others.

Three different positions (e.g., raised, lowered, and partially raised) of the sideboom 30, of which forward beam 38 is visible, are shown in FIG. 2. The sideboom 30 may be coupled, via forward connector 34 and pin joint 35, to the frame 12. For example, the sideboom 30 is pivotable about the pin joint 35 relative to the frame 12 about sideboom pivot axis 32.

Based on information from pin joint 35, outputs may be provided through the wiring harness 96 to indicate sideboom 30 orientation. This angular orientation can be provided using a pin cartridge assembly 300 (FIG. 3) to indicate rotation about the sideboom pivot axis 32 at pin joint 35. While sideboom orientation is illustrated in FIG. 2, other orientations or angles can be provided for other structures, or for other types of work machines other than the pipelayer described herein.

Figure 3:
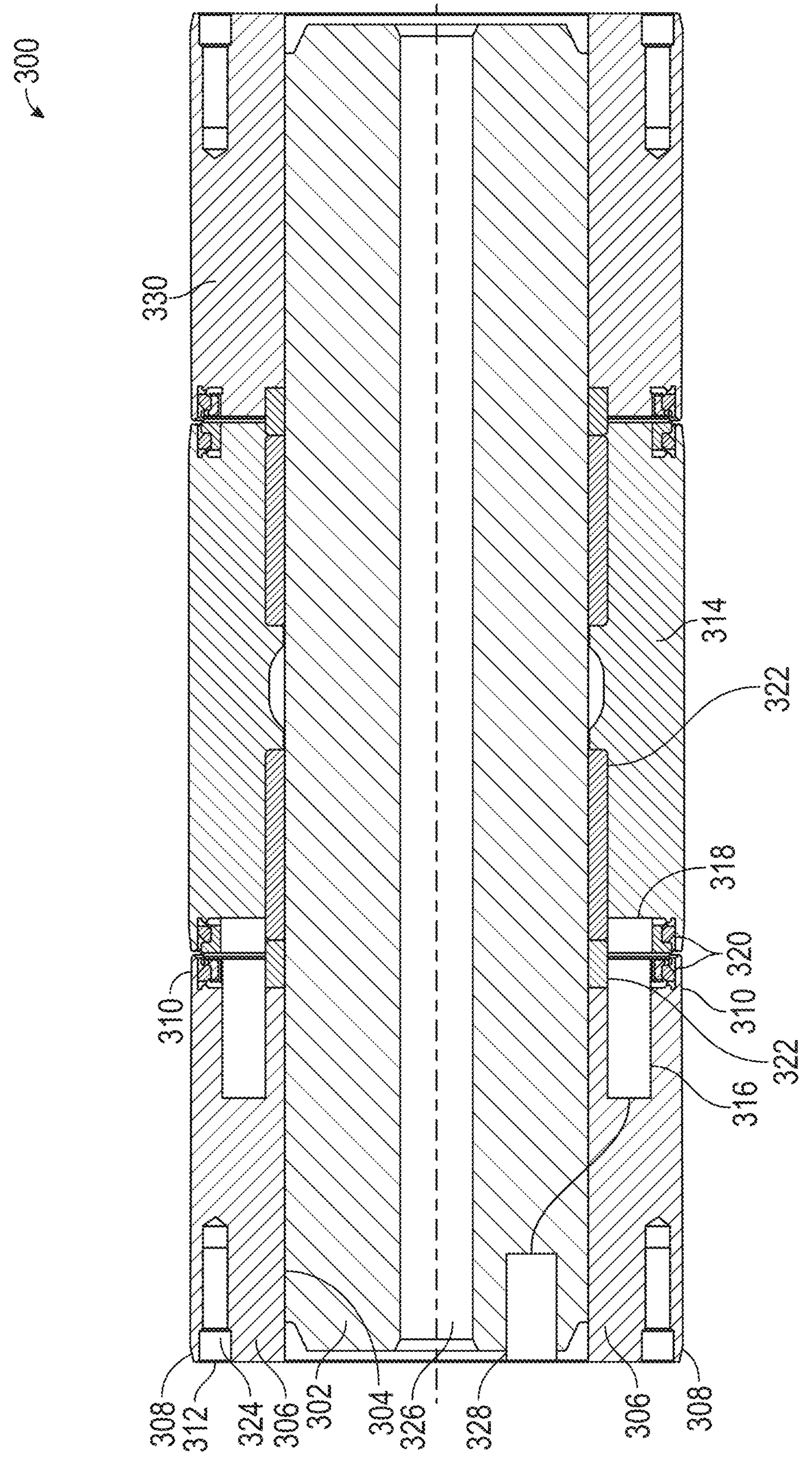
FIG. 3 is a schematic diagram of a pin cartridge assembly in accordance with this disclosure.

FIG. 3 is a schematic diagram of a pin cartridge assembly 300 in accordance with this disclosure. As described above, the pin cartridge assembly 300 can be installed on the axis of rotation (e.g., sideboom pivot axis 32) between two bodies, e.g., at a pin joint. Pin joints can be employed on many types of equipment, such as the work machine 10 or similar equipment, to provide pivot points between adjoining components. Most pin joints include various assemblies and structures intended to help prevent premature breakage or wear, for instance components that define chambers for holding lubricant. While embodiments have been described with respect to a pipelayer, embodiments can be implemented for pin cartridge assemblies between any two bodies that rotate relative to each other on any work machine.

The pin cartridge assembly 300 can include a pin 302 having an outer surface 304. A first sleeve (or bushing) 306 can be coupled at the outer surface 304 of the pin 302. The first sleeve 306 can have a first end 308 and a second end 310 opposite the first end 308. The first sleeve 306 can be statically coupled to a static structure 312 (e.g., cap or other containment structure for the pin 302) at the first end 308. In examples, a fastener 324 (e.g., a weld, bolt, or similar apparatus) can be used to statically couple the first sleeve 306 to the static structure 312. The pin cartridge assembly 300 can include a second sleeve (or bushing) 314. The second sleeve 314 can be movably connected at the second end 310 of the first sleeve 306.

A sealing assembly 320 can be provided between the first sleeve 306 and the second sleeve 314. The sealing assembly 320 can prevent lateral movement of the second sleeve 314. The pin cartridge assembly 300 can include a pair of bearings 322 between the sealing assembly 320 and the outer surface 302 of the pin 300. The sealing assembly 320 can include metal-to-metal face seals each having seal rings and gaskets. The seal rings in each of the seals can abut one another. Further, the gaskets can each engage the sleeves 306, 314 with respective seal rings.

The pin cartridge assembly 300 includes an angle sensing element 316 and an angle sensor target 318 coupled each to different ones of the first sleeve 306 and the second sleeve 314 (e.g., the angle sensing element 316 and the angle sensor target 318 will not be coupled to the same sleeve) to detect angle of rotation of a joint associated with the pin cartridge assembly 300. In examples, the angle sensing element 316 and the angle sensor target 318 may be coupled at the sealing assembly 320. The angle sensor target 318 can be coupled to the second sleeve 314 proximate one of the pair of bearings 322 (or other friction joint) or at a bearing surface thereof. In examples, the angle sensing element 316 may be coupled to the first sleeve 306 and the angle sensor target 318 may be coupled to the second sleeve 314. Various well known noncontact sensors such as magnetic angle sensors can be used. As the angle sensor target 318 rotates, therefore, angle can be detected at the angle sensing element 316. Precise alignment is provided as the angle sensing element 316 and the angle sensor target 318 are proximate each other in one assembly, thereby removing the need for installers or manufacturing to perform precise alignment operations.

A lubrication channel 326 can be provided (e.g., through a center channel of the pin 302) for lubrication of the pin cartridge assembly 300 or of the corresponding joint or nearby structures. The pin cartridge assembly 300 can include an electrical connector 328 for connecting the angle sensing element 316 to control circuitry (e.g., through wiring harness 96). In examples, the electrical connector 328 can be bolted to a cover of the pin cartridge assembly 300. A third sleeve 330 can be provided, which can be static or dynamic and which will typically not include any angle sensing components or electrical connectors.

By being provided within a pin cartridge assembly 300, the angle monitoring assembly (e.g., angle sensing element 316 and angle sensor target 318) will not rely on precise alignment mechanisms. Further, sensor elements are shielded from harsh environments in construction work spaces.

INDUSTRIAL APPLICABILITY

In general, a work machine 10 can be operated to control angles of different parts of the work machine 10 relative to each other and relative to a work surface. Sensors can sense these different angles. The sensors are included in a cartridge-style configuration within rotatable joints, for example in a pin joint. One portion of the sensor can be included in a dynamic or movable portion of the joint while the other portion (e.g., receiver) of the sensor is located in a stationary portion where electronic circuitry is more easily mounted to the sensor for providing electrical signals of the sensor to control circuitry or other portions of the work machine 10.

While the work machine 10 is executing a work plan, the operator can change or monitor the angle of different tools and apparatuses both in the interest of safety and in the interest of performing the work plan efficiently or effectively. Angle sensors allow operator control.

The above detailed description is intended to be illustrative, and not restrictive. The scope of the disclosure should, therefore, be determined with references to the appended claims, along with the full scope of equivalents to which such claims are entitled.

What is claimed is:

1. A pin cartridge assembly, comprising:
- a pin having an outer surface;
- a first sleeve coupled at the outer surface of the pin, the first sleeve having a first end and a second end opposite the first end, wherein the first sleeve statically coupled to a static structure at the first end;
- a second sleeve, the second sleeve being moveably connected at the second end of the first sleeve;
- an angle sensing element coupled to the first sleeve; and
- an angle sensor target coupled to the second sleeve, wherein the angle sensing element and the angle sensor target are configured to detect angle of rotation of a joint associated with the pin cartridge assembly.

2. The pin cartridge assembly of claim 1, further comprising:
- a sealing assembly between the first sleeve and the second sleeve, and wherein the angle sensor target is coupled to the second sleeve proximate the sealing assembly.

3. The pin cartridge assembly of claim 2, further comprising a pair of bearings between the sealing assembly and the outer surface of the pin and wherein the angle sensor target is coupled to the second sleeve proximate one of the pair of bearings.

4. The pin cartridge assembly of claim 1, further comprising an electrical connector for connecting the angle sensing element.

5. The pin cartridge assembly of claim 4, wherein the electrical connector is bolted to a cover of the pin cartridge assembly.

6. The pin cartridge assembly of claim 1, further comprising a lubrication channel through a center channel of the pin.

7. The pin cartridge assembly of claim 1, wherein the angle sensor target comprises a magnet.

8. A pin joint for a work machine, comprising:
- a frame having first and second wall portions, each of the first and second wall portions having a frame bore positioned therein;
- a movable portion having a second bore positioned therein to align with the frame bore; and
- a pin cartridge assembly positioned in the frame bore and the second bore, the pin cartridge assembly, comprising:
- a pin having an outer surface;
- a first sleeve coupled at the outer surface of the pin, the first sleeve having a first end and a second end opposite the first end, the first sleeve statically coupled at the first end;
- a second sleeve, the second sleeve being movably connected at the second end of the first sleeve;
- an angle sensing element coupled to the first sleeve; and
- an angle sensor target coupled to the second sleeve, wherein the angle sensing element and the angle sensor target are configured to detect angle of rotation of a joint associated with the pin cartridge assembly.

9. The pin joint of claim 8, further comprising:
- a sealing assembly between the first sleeve and the second sleeve, and wherein the angle sensor target is coupled to the second sleeve proximate the sealing assembly.

10. The pin joint of claim 9, further comprising a pair of bearings between the sealing assembly and the outer surface of the pin and wherein the angle sensor target is coupled to the second sleeve proximate one of the pair of bearings.

11. The pin joint of claim 8, further comprising an electrical connector for connecting the angle sensor target.

12. The pin joint of claim 11, further comprising at least one of control circuitry, a power supply, or a display electrically coupled to the electrical connector.

13. The pin joint of claim 11, wherein the electrical connector is bolted to a cover of the pin cartridge assembly.

14. The pin joint of claim 8, further comprising a lubrication path through a center channel of the pin.

15. The pin joint of claim 8, wherein the movable portion includes a boom.

16. The pin joint of claim 8, wherein the first sleeve is welded to a frame bore of the work machine.

* * * * *